United States Patent
Hong et al.

(10) Patent No.: US 9,002,520 B2
(45) Date of Patent: Apr. 7, 2015

(54) USER INTERFACE DEVICE OF REMOTE CONTROL SYSTEM FOR ROBOT DEVICE AND METHOD USING THE SAME

(75) Inventors: Soon Hyuk Hong, Suwon-si (KR); Gi Oh Kim, Uiwang-si (KR); Jong Ho Park, Yongin-si (KR); Ji Hyun Park, Seoul (KR); Seung Hyun Baek, Gwangmyeong-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 912 days.

(21) Appl. No.: 12/336,717

(22) Filed: Dec. 17, 2008

(65) Prior Publication Data

US 2009/0157228 A1    Jun. 18, 2009

(30) Foreign Application Priority Data

Dec. 18, 2007  (KR) .......................... 10-2007-0133260

(51) Int. Cl.
*G05B 19/048* (2006.01)
*B25J 9/16* (2006.01)

(52) U.S. Cl.
CPC ..... *B25J 9/1689* (2013.01); *G05B 2219/40161* (2013.01); *G05B 2219/40165* (2013.01)

(58) Field of Classification Search
CPC ............. B29C 70/54; B29C 2037/906; G01N 21/8806; G01N 21/95; G01N 21/94; G01N 2021/8825; G01N 33/36; G01N 2021/8472; G01N 29/0627; G01N 29/30; H04N 5/265; H04N 5/332; H04N 5/33; H04N 7/18; G01T 1/1648

USPC ........... 318/568.12, 568.16, 568.25; 700/245, 700/259, 258, 264; 340/435; 348/164, 348/218.1, 162, 163; 382/141; 901/1, 47

See application file for complete search history.

(56) References Cited

U.S. PATENT DOCUMENTS 4,642,687 A  *  2/1987  Wedgwood et al. .......... 348/162
4,967,276 A  *  10/1990 Murakami et al. ............ 348/164

(Continued)

FOREIGN PATENT DOCUMENTS

JP  61245212 A  * 10/1986
JP  02277105 A  * 11/1990

(Continued)

OTHER PUBLICATIONS

Borenstein et al.; Histogram In-Motion Mapping for Mobile Robot Obstacle Avoidance; IEEE Transactions on Robotics and Automation; vol. 7, No. 4, Aug. 1991; pp. 535-539.*

*Primary Examiner* — Stephen Holwerda
(74) *Attorney, Agent, or Firm* — Cha & Reiter, LLC

(57) ABSTRACT

A user interface device of a remote control system for a robot and a method using the same are provided. The user interface device includes: a radio frequency (RF) unit for receiving, from a remote control robot, camera data and at least one sensor data detecting a distance; a display unit having a main screen and at least one auxiliary screen; and a controller having an environment evaluation module for determining whether the received camera data are in a normal condition, and having a screen display mode change module for displaying, if the received camera data are in a normal condition, the camera data on the main screen and displaying, if the received camera data are in an abnormal condition, the sensor data on the main screen.

16 Claims, 6 Drawing Sheets

(56) References Cited

U.S. PATENT DOCUMENTS

| | | | |
|---|---|---|---|
| 5,001,558 A * | 3/1991 | Burley et al. | 348/164 |
| 5,949,331 A * | 9/1999 | Schofield et al. | 340/461 |
| 6,430,471 B1 * | 8/2002 | Kintou et al. | 700/245 |
| 6,535,242 B1 * | 3/2003 | Strumolo et al. | 348/148 |
| 2002/0003378 A1 * | 1/2002 | Marcus et al. | 307/10.1 |
| 2004/0013295 A1 * | 1/2004 | Sabe et al. | 382/153 |
| 2005/0025350 A1 * | 2/2005 | Engelbart et al. | 382/141 |
| 2005/0074221 A1 * | 4/2005 | Remillard et al. | 385/147 |
| 2007/0282484 A1 * | 12/2007 | Chung et al. | 700/245 |
| 2007/0282531 A1 | 12/2007 | Park et al. | |
| 2009/0001268 A1 * | 1/2009 | Tadano | 250/330 |

FOREIGN PATENT DOCUMENTS

| | | | | |
|---|---|---|---|---|
| JP | 2001-62766 A | 3/2001 | | |
| JP | 2002-355779 A | 12/2002 | | |
| JP | 2007-196300 A | 8/2007 | | |
| KR | 2001-0007842 | 2/2001 | | A63H 30/00 |
| KR | 10-2007-0115244 A | 12/2007 | | |

* cited by examiner

USER INTERFACE DEVICE OF REMOTE CONTROL SYSTEM FOR ROBOT DEVICE AND METHOD USING THE SAME

CLAIMS OF PRIORITY

This application claims priority to an application entitled "USER INTERFACE DEVICE OF REMOTE CONTROL SYSTEM FOR ROBOT DEVICE AND METHOD USING THE SAME" filed in the Korean Intellectual Property Office on Dec. 18, 2007 and assigned Serial No. 2007-0133260, the entire contents of which are incorporated herein by reference.

BACKGROUND OF THE INVENTION

1. Field of the Invention

The present invention relates to a user interface device of a remote control system for a robot and a method using the same. More particularly, the present invention relates to a user interface device that can receive remote location environment information acquired from a remote control robot, determine remote environment characteristics, and display the most appropriate remote location environment information for an operation environment on a main screen of a display unit in the user interface device.

2. Description of the Related Art

Nowadays, due to a requirement for a service for linking a home network and an intelligent robot, development of intelligent robots providing various linking services is being actively performed.

Particularly, due to development of wired and wireless communication technology, an infrastructure for a sensor network together with mobile communication and Internet functionality has become widely available, and an intelligent robot that can perform a communication function, be independently operated, and provide a service at any time and place has been launched. As embedded type robots that do not externally have a form of a robot traditionally envisioned by the general public, but that can provide various information and services to people, are introduced, interest in intelligent robots has increased.

However, when a user controls a robot in a home at a location remote from the user, it is inconvenient for the user to view remote location environment information acquired from a sensor group mounted in a robot in a display device, to directly check all sensor data, to determine a traveling and operation environment of the robot and to control multiple robot groups through a robot control module. Further, as the quantity of robots to control increases, an amount of sensor data for the user to process rapidly increases, and therefore it is difficult to control a robot at a remote location.

Therefore, a demand has arisen for a user interface that recognizes an operation environment of the robot and provides optimal information of the operation environment to the user, whereby the user can intuitively and effectively control the robot.

SUMMARY OF THE INVENTION

The present invention provides a user interface device that receives remote location environment information acquired and transmitted by a remote control robot, extracts the most appropriate environment information for an operation environment from the environment information, and provides the most appropriate environment information on a main screen of a display unit in the user interface device.

For remote location environment information not displayed on a main screen, the present invention further provides a user interface device that displays the remote location environment information on a first auxiliary screen and a second auxiliary screen of the display unit.

If a moving obstacle is detected by an infrared sensor, the present invention further provides a user interface device that when ultrasonic sensor data are displayed on the main screen displays infrared sensor data on the main screen.

In accordance with an exemplary embodiment of the present invention, a user interface device includes: a radio frequency (RF) unit for receiving, from an external device, camera data and at least one sensor data detecting a distance; a display unit including a main screen and at least one auxiliary screen; and a controller having an environment evaluation module for determining whether the received camera data are in a normal condition, and having a screen display mode change module for displaying, if the received camera data are in a normal condition, the camera data on the main screen and displaying, if the received camera data are not in a normal condition, the sensor data on the main screen.

The external device may be a remote control robot including: a camera; a sensor unit having at least one sensor for detecting a distance; a data acquisition module for acquiring data from the camera and the sensor unit; and an RF unit for transmitting the data acquired by the data acquisition module to the user interface device.

In accordance with another exemplary embodiment of the present invention, a user interface method includes: receiving, from an external device, camera data and at least one sensor data detecting a distance; determining whether the received camera data are in a normal condition; displaying, if the received camera data are in a normal condition, the camera data on a main screen; and displaying, if the received camera data are not in a normal condition, the sensor data on the main screen.

BRIEF DESCRIPTION OF THE DRAWINGS

The features and advantages of the present invention will be more apparent from the following detailed description taken in conjunction with the accompanying drawings, in which.

DETAILED DESCRIPTION OF THE INVENTION

Exemplary embodiments of the present invention are described in detail with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

A user interface device according to exemplary embodiments of the present invention includes a personal computer (PC), notebook computer, ultra mobile personal computer (UMPC), personal digital assistant (PDA), a smart phone, International Mobile Telecommunication 2000 (IMT-2000) terminal, and universal mobile telecommunications system (UMTS).

An external device remotely connected to a user interface device according to an exemplary embodiment of the present invention is embodied as a remote control robot; however the external device may be any device that can acquire remote environment information.

Remote location environment information according to exemplary embodiments of the present invention may be camera data, ultrasonic sensor data, and infrared sensor data of a surrounding environment of a remote control robot acquired by the remote control robot.

Figure 1:
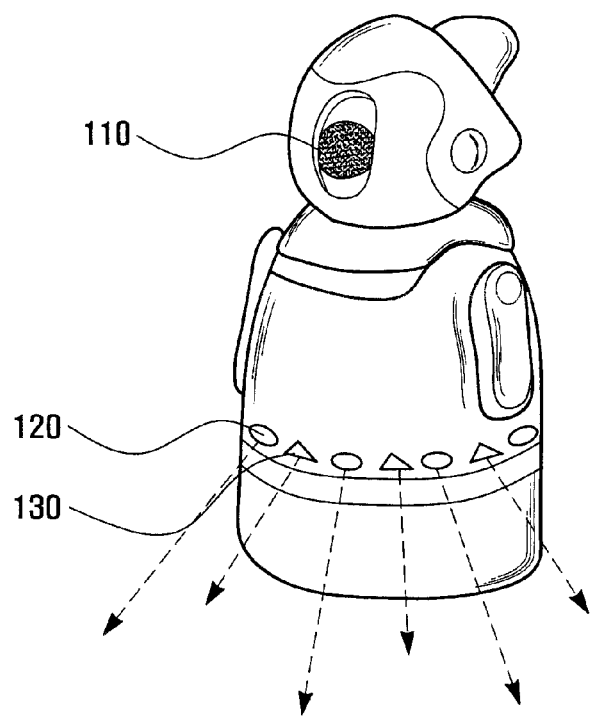
FIG. 1 is a perspective view illustrating a remote control robot according to an exemplary embodiment of the present invention.

FIG. 1 is a perspective view illustrating a remote control robot 100 according to an exemplary embodiment of the present invention.

In operation, the remote control robot 100 recognizes a surrounding environment using a camera and a sensor unit. The remote control robot 100 moves according to a user instruction at a remote location and may provide a home security service as well as housework such as cleaning. A sensor unit may include all sensors that can recognize an operation environment (that is, characteristics of an environment in which the remote control robot 100 operates) of the remote control robot 100.

In exemplary embodiments of the present invention, the sensor unit includes an ultrasonic sensor 120 and an infrared sensor 130. A camera 110 is used for acquiring image data of a surrounding environment of the remote control robot 100. When it is inappropriate to recognize the surrounding environment of the remote control robot 100 with only image data of the camera 110, the ultrasonic sensor 120 is used for acquiring ultrasonic sensor data. Further, the infrared sensor 130 is used for detecting an obstacle in a local area that cannot be detected using the ultrasonic sensor data of the ultrasonic sensor 120. The infrared sensor 130 has a measurement distance error ratio less than that of the ultrasonic sensor 120 and is used for detecting an obstacle at a short distance, in which the ultrasonic sensor 120 cannot detect an obstacle. The remote control robot 100 can transmit data acquired by the camera 110, the ultrasonic sensor 120, and the infrared sensor 130 to a user interface device at a remote location using an RF network.

Figure 2:
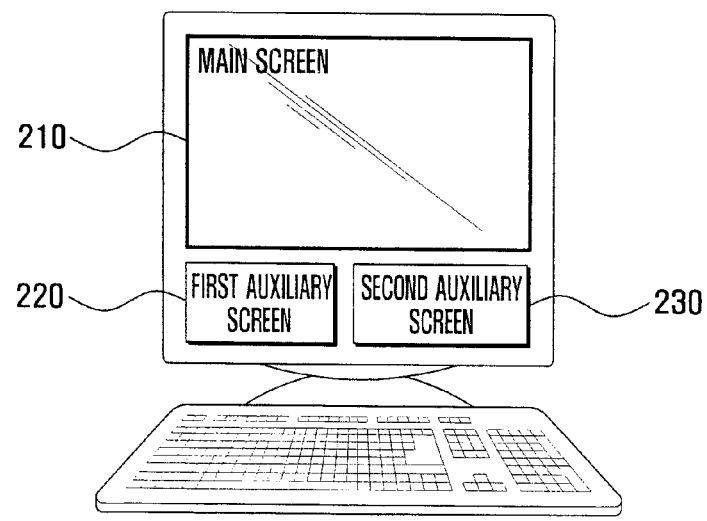
FIG. 2 is a diagram illustrating a user interface device according to another exemplary embodiment of the present invention.

FIG. 2 is a diagram illustrating a user interface device 200 according to another exemplary embodiment of the present invention.

The user interface device 200 receives remote location environment information acquired and transmitted from the camera 110, the ultrasonic sensor 120, and the infrared sensor 130 of the remote control robot 100 through the RF network. Further, the user interface device 200 displays the most appropriate environment information for an operation environment among the remote location environment information on a main screen 210 of a display unit. The remote location environment information that is not displayed on the main screen 210 may be displayed on a first auxiliary screen 220 and a second auxiliary screen 230 of the display unit. Accordingly, when the remote control robot 100 is at a location remote from a user, the user can connect to the remote control robot 100 through the RF network and control the remote control robot 100 using the remote location environment information displayed on the main screen 210 of the display unit.

Specifically, after receiving the remote location environment information, if camera data acquired from the camera 110 are in a normal condition, the user interface device 200 displays the camera data on the main screen 210. The user interface device 200 may display ultrasonic sensor data on the first auxiliary screen 220 and infrared sensor data on the second auxiliary screen 230, or may display the ultrasonic sensor data on the second auxiliary screen 230 and the infrared sensor data one the first auxiliary screen 220. If the camera data are not in a normal condition, for example because the operation environment is too bright or too dark, the user interface device 200 displays the ultrasonic sensor data on the main screen 210. The user interface device 200 may then display the camera data on the first auxiliary screen 220 and the infrared sensor data on the second auxiliary screen 230, or may display the camera data on the second auxiliary screen 230 and the infrared sensor data on the first auxiliary screen 220. Further, when the ultrasonic sensor data are displayed on the main screen 210, if an obstacle appears in the vicinity of the remote control robot 100 that cannot be detected by the ultrasonic sensor 120, the user interface device 200 displays the infrared sensor data acquired from the infrared sensor 130 on the main screen 210. The user interface device 200 may then display camera data on the first auxiliary screen 220 and the ultrasonic sensor data on the second auxiliary screen 230, or may display the camera data on the second auxiliary screen 230 and the ultrasonic sensor data on the first auxiliary screen 220.

Figure 3:
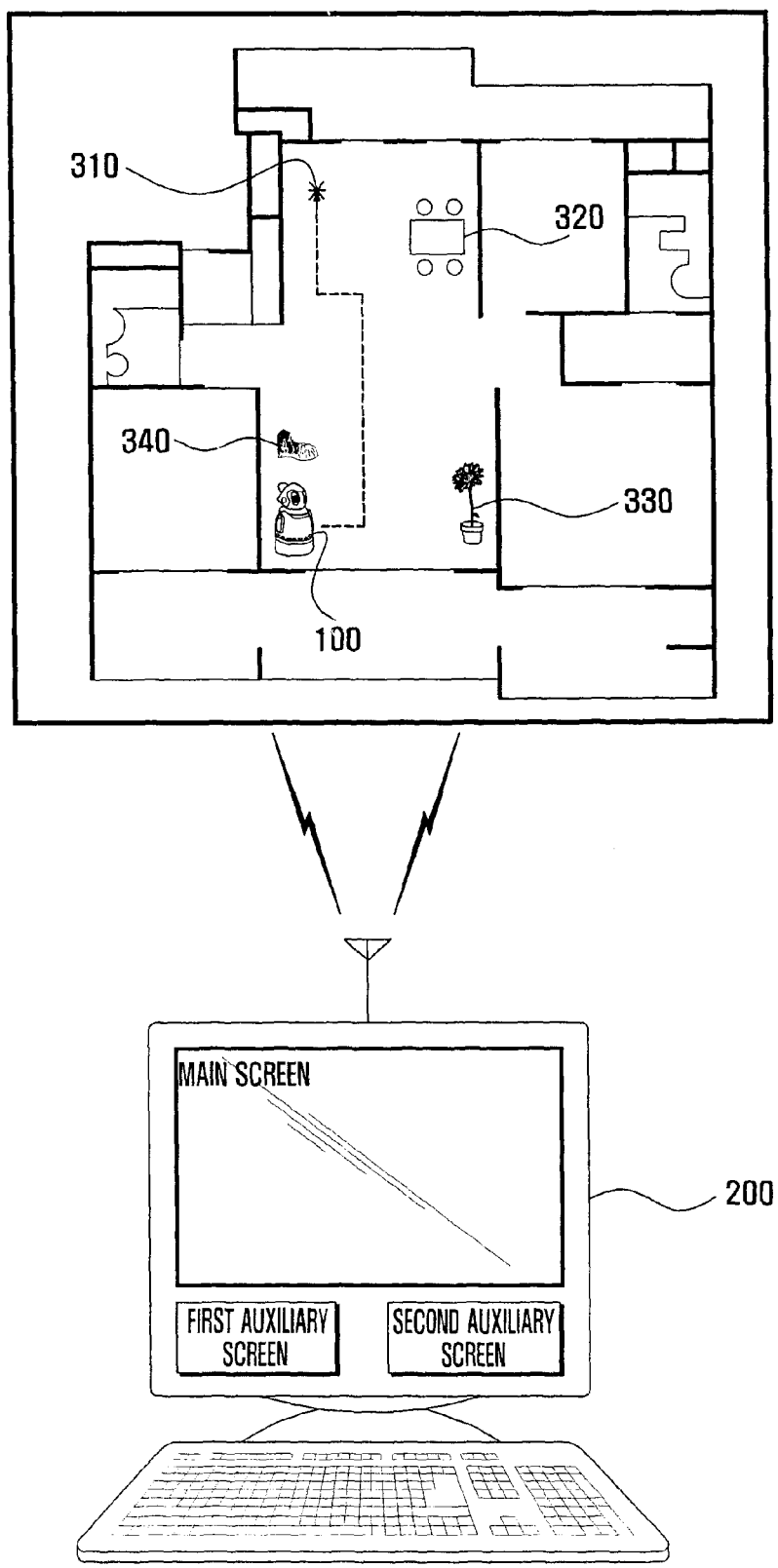
FIG. 3 is a diagram illustrating an example of user control of a remote control robot at a remote location using a user interface method according to another exemplary embodiment of the present invention.

FIG. 3 is a diagram illustrating an example of user control of the remote control robot 100 at a remote location using a user interface method according to another exemplary embodiment of the present invention.

The user controls the remote control robot 100 at a remote location using the user interface device 200 connected to the remote control robot 100 through an RF network. Before the user controls the remote control robot 100 to perform a desired operation at the remote location, the user should safely move the remote control robot 100 to a desired destination 310 at the remote location.

In order for the user to move the remote control robot 100 from any location shown in FIG. 3 to the desired destination 310, the remote control robot 100 should avoid a moving obstacle 340 as well as fixed obstacles 320 and 330. For this, the user receives remote location environment information acquired by the remote control robot 100 through the user interface device 200, determines characteristics of the surrounding environment of the remote control robot 100, and controls a direction and a speed of the remote control robot 100, thereby moving the remote control robot 100 to the destination 310. The remote control robot 100 first acquires remote location environment information using the camera 110, the ultrasonic sensor 120, and the infrared sensor 130, processes a signal of the information, and transmits the processed signal to the remotely located user interface device 200. The user interface device 200 receives the processed signal and displays the most appropriate environment information for an operation environment among the camera data, ultrasonic sensor data, and infrared sensor data on the main screen 210 of the display unit. If the camera data transmitted from the camera 110 is in a normal condition, the user interface device 200 displays the camera data on the main screen 210. Accordingly, the user can control the remote control robot 100 to move to the destination 310 using the camera data displayed on the main screen 210.

While the user moves the remote control robot 100 to the destination 310, if the camera data are not in a normal condition because the camera data cannot supply enough information for movement of the remote control robot 100 (for example, if the operation environment is too bright or too dark), the user interface device 200 displays the ultrasonic sensor data on the main screen 210. The user interface device 200 may then display the camera data acquired by the camera 110 on the first auxiliary screen 220 and display the infrared sensor data acquired by the infrared sensor 130 on the second auxiliary screen 230. Further, while the user moves the remote control robot 100 using the ultrasonic sensor data, if the moving obstacle 340 appears in a local area that cannot be detected by the ultrasonic sensor 120, the user interface device 200 displays the infrared sensor data on the main screen 210. The user interface device 200 may then display the camera data acquired by the camera 110 on the first auxiliary screen 220 and display ultrasonic sensor data acquired by the ultrasonic sensor 120 on the second auxiliary screen 230.

Figure 4:
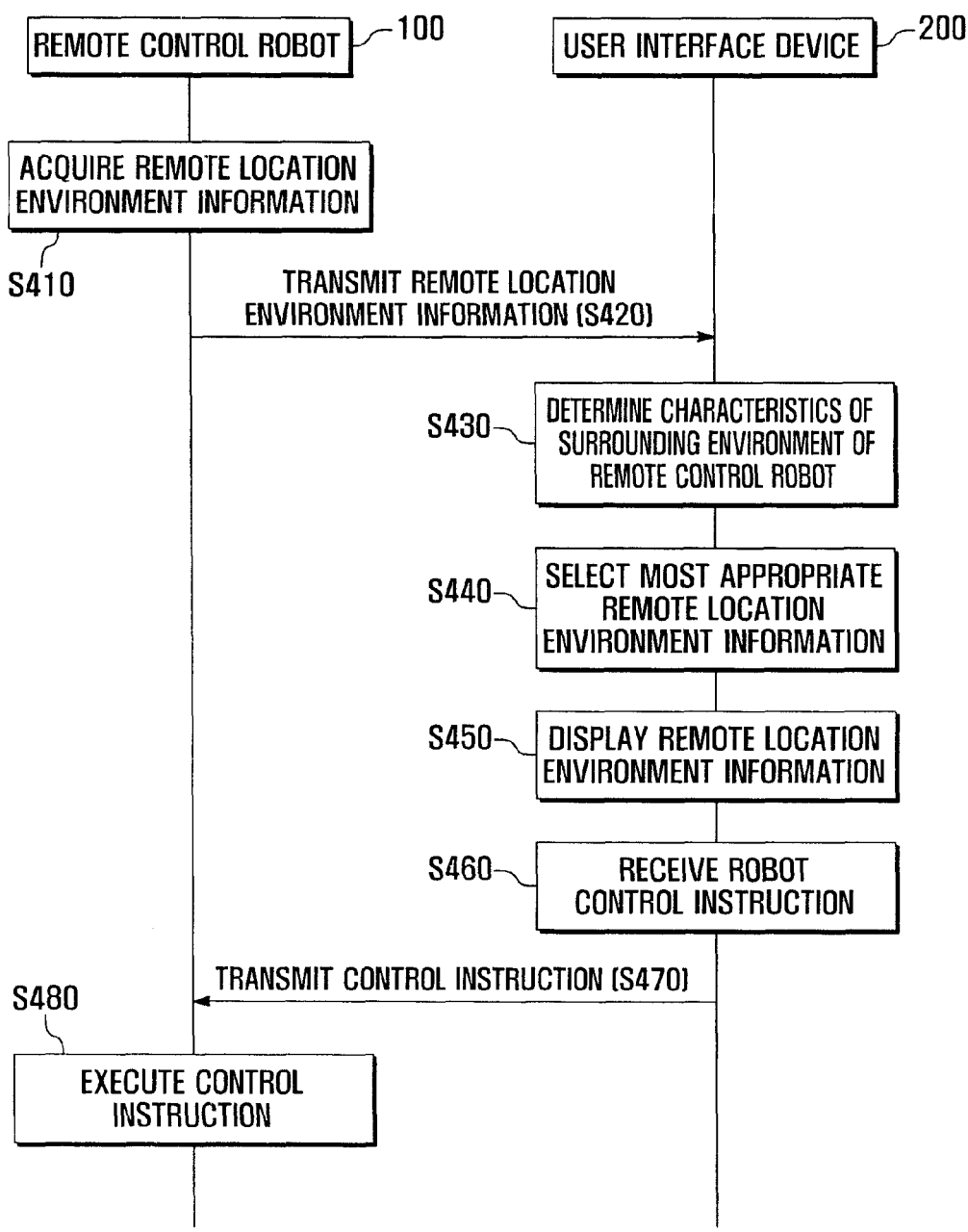
FIG. 4 is a flowchart illustrating the user interface method of FIG. 3.

Therefore, as the surrounding environment of the remote control robot 100 changes, the user can check remote location environment information for the operation environment through the main screen 210 of the display unit and control the remote control robot 100 at a remote location. FIG. 4 is a flowchart illustrating the user interface method of FIG. 3.

The remote control robot 100 acquires remote location environment information using the camera 110, the ultrasonic sensor 120, and the infrared sensor 130 (S410).

The remote control robot 100 processes a signal of the acquired remote location environment information and transmits the signal to the user interface device 200 through an RF network (S420).

The user interface device 200 receives the remote location environment information and determines surrounding environment characteristics of the remote control robot 100 based on data of each of the camera 110, the ultrasonic sensor 120, and the infrared sensor 130 (S430), and selects the most appropriate remote location environment information for the operation environment based on the determined environment characteristics (S440).

The user interface device 200 displays the selected most appropriate remote location environment information on the main screen 210 of the display unit, and also display the remaining remote location environment information on the first auxiliary screen 220 and the second auxiliary screen 230 of the display unit (S450). The user can then check the remote location environment information displayed on the main screen 210 and control the remote control robot 100.

When the user interface device 200 receives a robot control instruction from the user for controlling the remote control robot 100 (S460), the user interface device 200 transmits the control instruction to the remote control robot 100 at a remote location through the RF network (S470).

The remote control robot 100 receives and executes the control instruction (S480).

Figure 5:
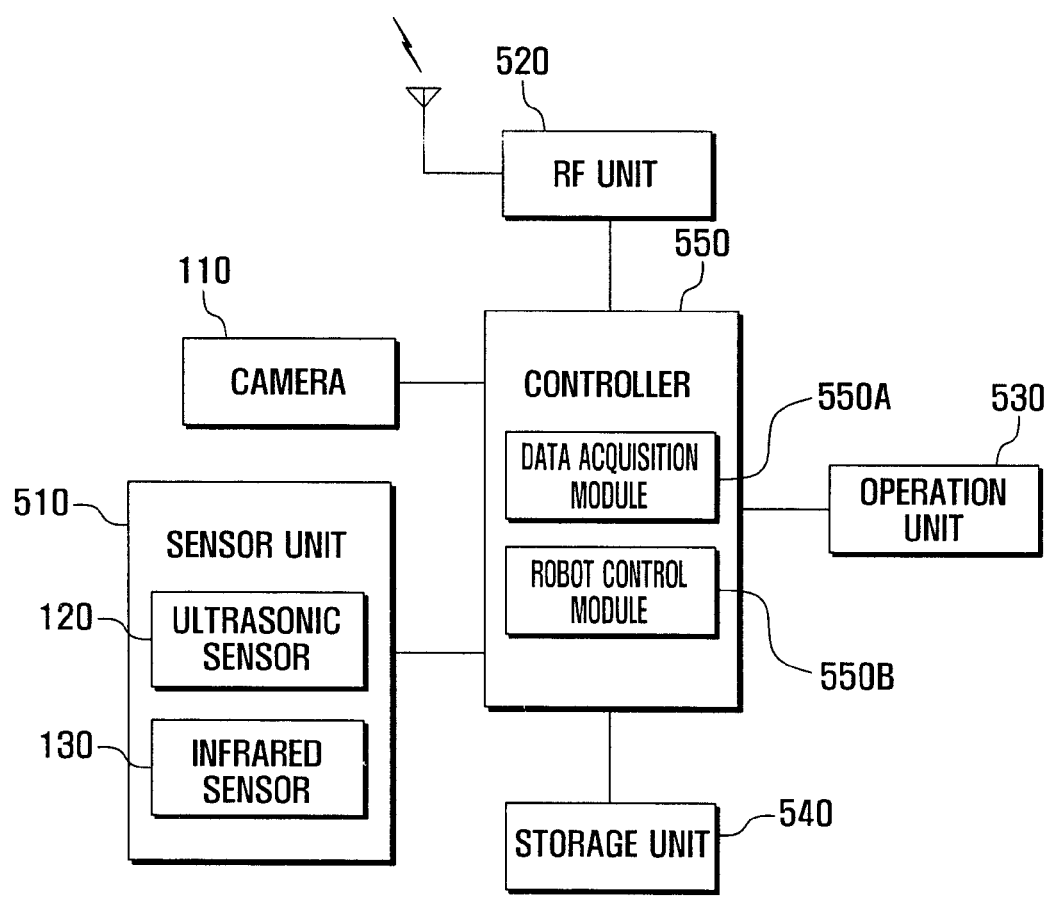
FIG. 5 is a block diagram illustrating a configuration of the remote control robot of FIG. 1.

FIG. 5 is a block diagram illustrating a configuration of the remote control robot 100.

The remote control robot 100 includes the camera 110, a sensor unit 510, an RF unit 520, an operation unit 530, a storage unit 540, and a controller 550.

The camera 110 is used for acquiring image data of the surrounding environment of the robot 110.

The sensor unit 510 includes all sensors for recognizing the operation environment of the remote control robot 100. In the exemplary embodiment of the present invention, the sensor unit 510 includes the ultrasonic sensor 120 and the infrared sensor 130. The ultrasonic sensor 120 may be used, when the camera data are not in a normal condition, for acquiring ultrasonic sensor data. Further, when using a user interface device employing ultrasonic sensor data because the camera data are not in a normal condition, the infrared sensor 130 may be used for acquiring infrared sensor data if an obstacle is detected in a local area that cannot be detected by the ultrasonic sensor 120 (for example, due to sudden appearance of an obstacle). The infrared sensor 130 has a measurement distance error ratio less than that of the ultrasonic sensor 120 and can detect an obstacle at a shorter distance than can the ultrasonic sensor 120.

The RF unit 520 includes all communication means for transmitting remote location environment information acquired by the sensor unit 510 to the user interface device 200 and receiving a control instruction transmitted from the user interface device 200. The RF unit 520 may comprise any RF communication means for connecting wirelessly to the Internet.

The operation unit 530 includes all units of the remote control robot 100 controlled according to a control instruction transmitted from the user interface device 200. For example, the operation unit 530 may include units of the remote control robot 100 such as a wheel in a lower part for moving the remote control robot 100, a motor for operating the wheel, an arm for performing a specific operation, and a motor for operating the arm.

The storage unit 540 stores necessary programs and data when the remote control robot 100 performs general operations such as acquisition of remote location environment information using the sensor unit 510 and execution of a control instruction of the user.

The controller 550 controls general operations of the remote control robot 100. Particularly, the controller 550 controls reception of remote location environment information acquired and transmitted by the camera 110 and the sensor unit 510, processes the signal thereof, and transmits the processed signal of the environment information to the user of the user interface device 200 through the RF unit 520. Further, the controller 550 receives a control instruction transmitted from the user interface device 200 through the RF unit 520 and controls the operation unit 530 to execute the received control instruction of the user.

In more detail, the controller 550 includes a data acquisition module 550A and a robot control module 550B. The data acquisition module 550A receives information about camera data, ultrasonic sensor data, and infrared sensor data respectively acquired from the camera 110, the ultrasonic sensor 120, and the infrared sensor 130 and processes a signal of the information. The remote location environment information of the processed signal is transmitted to the user interface device 200 through the RF unit 520. The robot control module 550B receives and analyzes a control instruction received from the user interface device 200 through the RF unit 520 and controls the operation unit 530 according to the analyzed control instruction so that the remote control robot 100 may perform the control instruction of the user.

Figure 6:
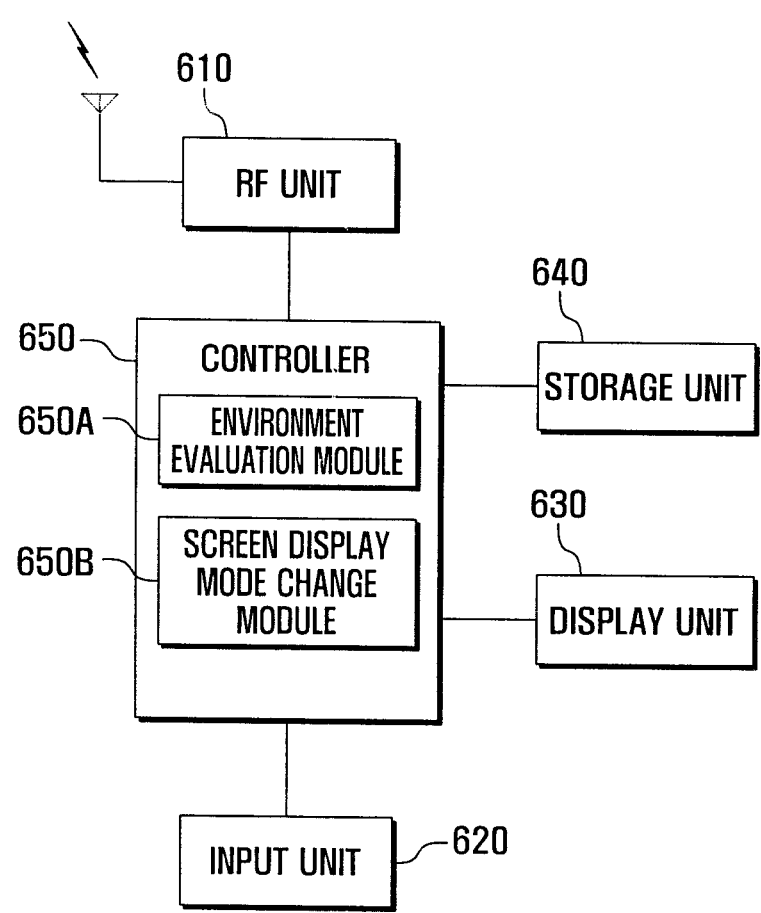
FIG. 6 is a block diagram illustrating a configuration of the user interface device of FIG. 2.

FIG. 6 is a block diagram illustrating a configuration of the user interface device 200.

The user interface device 200 includes an RF unit 610, input unit 620, display unit 630, storage unit 640, and controller 650.

The RF unit 610 includes all communication means for receiving remote location environment information acquired and transmitted by the remote control robot 100 and for transmitting a control instruction of the user interface device 200 to the remote control robot 100. The RF unit 610 includes but is not limited to an RF communication means for connecting wirelessly to the Internet.

The input unit 620 includes but is not limited to at least one of a keypad, a touch screen, and a touch pad and is used for inputting a user instruction. Particularly, the user can input a control instruction for controlling the remote control robot 100 using the input unit 620.

The display unit 630 includes but is not limited to an LCD unit and displays various display data and operating states generated in the user interface device on a screen thereof. Particularly, the display unit 630 comprises a plurality of screens and may display the most appropriate remote location environment information for an operation environment among camera data, ultrasonic sensor data, and infrared sensor data acquired and transmitted by the remote control robot 100 on a main screen 210 and display the remaining remote location environment information on a first auxiliary screen 220 and a second auxiliary screen 230.

The storage unit 640 stores programs and data necessary for general operations of the user interface device 200. Particularly, the storage unit 640 comprises storage for a program necessary for an operation of extracting the most appropriate environment information among remote location environment information transmitted by the remote control robot 100 and displaying the information on the main screen 210 of the display unit 630.

The controller 650 controls general operations of the user interface device. Particularly, the controller 650 receives remote location environment information acquired and transmitted by the remote control robot 100 through the RF unit 610 and extracts the most appropriate environment information for an operation environment. The controller 650 controls the display unit 630 to display the extracted environment information on the main screen 210 and to display the remaining environment information on the first auxiliary screen 210 and the second auxiliary screen 220. Further, the controller 650 controls to transmit a control instruction input through the input unit 620 to the remote control robot 100 through the RF unit 610.

The controller 650 includes an environment evaluation module 650A and a screen display mode change module 650B. The environment evaluation module 650A can determine characteristics of the surrounding environment of the remote control robot 100 by analyzing the received remote location environment information and select the most appropriate environment information for the operation environment based on the determined environment characteristics. In more detail, the environment evaluation module 650A analyzes the received camera data and, if light intensity of the camera data is in a range between a first reference value for setting a brightness limit and a second reference value for setting a darkness limit, determines the camera data as in a normal condition. Accordingly, when the camera data are in a normal condition, the screen display mode change module 650B displays the camera data on the main screen 210 and respectively displays the ultrasonic sensor data and the infrared sensor data on the first auxiliary screen 220 and the second auxiliary screen 230.

If the light intensity value of the camera data is equal to or greater than the first reference value, the environment evaluation module 650A determines light intensity of the camera data as too bright and, if the light intensity value of the camera data is equal to or less than the second reference value, light intensity of the camera data is determines as too dark, thereby determining the light intensity of the camera data as not in a normal condition.

Accordingly, the screen display mode change module 650B displays the ultrasonic sensor data on the main screen 210 and respectively displays the camera data and the infrared sensor data on the first auxiliary screen 220 and the second auxiliary screen 230.

When the screen display mode change module 650B determines the camera data as not in a normal condition and displays the ultrasonic sensor data on the main screen 210, if a moving obstacle is detected by the infrared sensor, the screen display mode change module 650B displays the infrared sensor data on the main screen 210 and respectively displays the camera data and the ultrasonic sensor data on the first auxiliary screen 220 and the second auxiliary screen 230.

Figure 7:
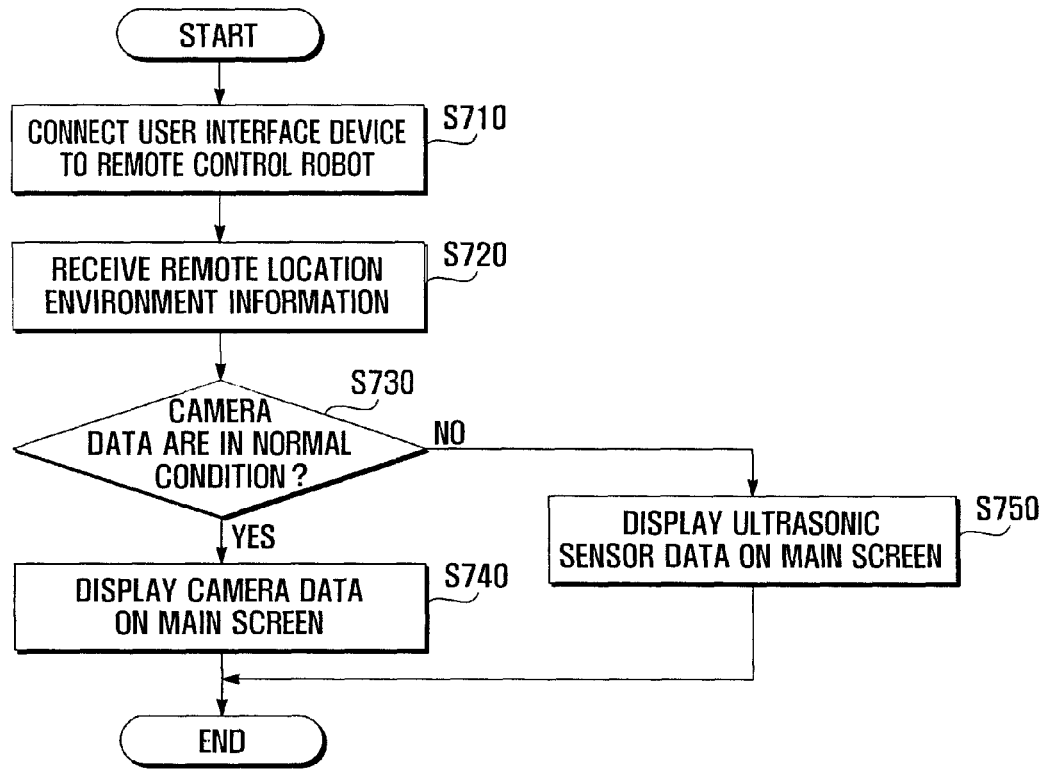
FIG. 7 is a flowchart illustrating a process of receiving and displaying remote location environment information in the user interface method of FIG. 3.

FIG. 7 is a flowchart illustrating a process of receiving and displaying remote location environment information in the user interface method of FIG. 3.

The controller 650 of the user interface device 200 controls to connect the remote control robot 100 and the user interface device 200 through an RF network (S710). In the present exemplary embodiment, the remote control robot 100 and the user interface device 200 are connected wirelessly through the Internet.

The controller 650 controls the RF unit 610 to receive remote location environment information acquired and transmitted by the remote control robot 100 (S720). The remote location environment information includes camera data, ultrasonic sensor data, and infrared sensor data acquired by the remote control robot 100.

The environment evaluation module 650A determines whether the camera data are in a normal condition (S730).

In more detail, the environment evaluation module 650A analyzes the received camera data and, if brightness value of the camera data is within a range between a first reference value and a second reference value, determines the camera data as in a normal condition. That is, if the brightness value of the camera data is equal to or greater than the first reference value, the environment evaluation module 650A determines the brightness of the camera data as too bright, and if the brightness value of the camera data is equal to or less than the second reference value, the environment evaluation module 650A determines the brightness of the camera data as too dark, thereby determining the condition as not in a normal condition.

If the camera data are in a normal condition, the screen display mode change module 650B displays the camera data on the main screen 210 (S740). In this case, the screen display mode change module 650B may display the ultrasonic sensor data on the first auxiliary screen 220 and the infrared sensor data on the second auxiliary screen 230, or may display the ultrasonic sensor data one the second auxiliary screen 230 and the infrared sensor data on the first auxiliary 220.

If the camera data are not in a normal condition at step S730, the screen display mode change module 650B displays the ultrasonic sensor data on the main screen 210 (S750). In this case, the camera data may be displayed on the first auxiliary screen 220 and the infrared sensor data on the second auxiliary screen 230 or the camera data may be displayed on the second auxiliary screen 230 and the infrared sensor data on the first auxiliary 220.

Figure 8:
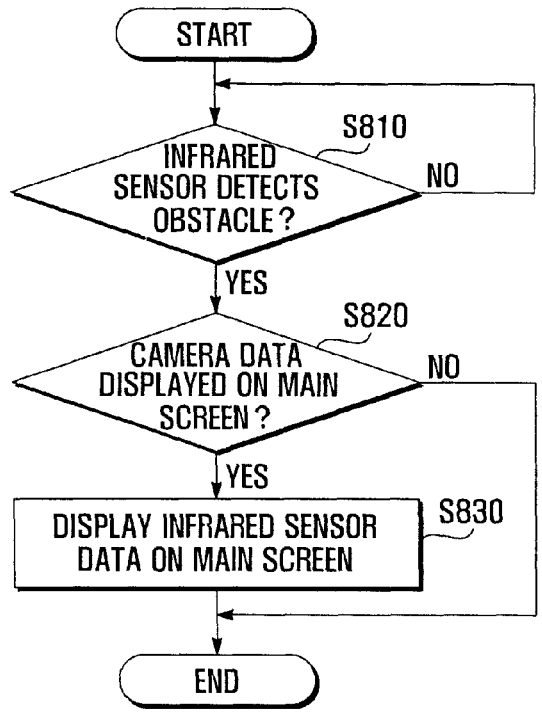
FIG. 8 is a flowchart illustrating a process of displaying ultrasonic sensor data in the user interface method of FIG. 3.

FIG. 8 is a flowchart illustrating a process of displaying ultrasonic sensor data in the user interface method of FIG. 3.

The infrared sensor detects whether a moving obstacle exists (S810).

If a moving obstacle exists, the screen display mode change module 650B determines whether camera data are displayed on the main screen 210 (S820).

If camera data are displayed on the main screen 210, the screen display mode change module 650B controls to continue to display the camera data on the main screen 210. However, if camera data are not displayed on the main screen 210, the screen display mode change module 650B controls to display the infrared sensor data on the main screen 210 (S830). In this case, the camera data may be displayed on the first auxiliary screen 220 and the ultrasonic sensor data may be displayed on the second auxiliary screen 230, or the camera data may be displayed on the second auxiliary screen 230 and the ultrasonic sensor data on the first auxiliary screen 220.

In exemplary embodiments of the present invention, a case where the remote control robot 100 moves to a destination is described, however the present invention can be applied to a case of detecting and tracking a moving object as well as to movement of the remote control robot 100.

As described above, a user interface device and method of a remote control robot system according to the present invention can display remote location environment information in a display device by acquiring remote environment information from a sensor group mounted in a remote control robot and the most appropriate remote location environment information for an operation environment. Accordingly, a user can intuitively and conveniently control the robot from a remote location using the operation environment of the surrounding environment of the remote control robot displayed on a main screen in the display device without directly checking each sensor data.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A user interface device comprising:
a radio frequency (RF) unit for receiving, from an external device, camera data and at least one sensor data having a remote location environment information;
a display unit having a main screen and at least one auxiliary screen; and
a controller having an environment evaluation module that evaluates the remote location environment information of the external device and determines whether or not the received camera data are in a normal condition for the remote location environment, and having a screen display mode change module that controls displaying the camera data on the main screen when the received camera data are in the normal condition, and controls changing the display on the main screen to display the received sensor data from an ultrasonic sensor on the main screen if the received camera data are not in the normal condition when an environment evaluation module determines the remote location environment as being too bright or too dark by comparing light intensity values with one or more reference values.

2. The user interface device of claim 1, wherein the external device is a remote control robot comprising:
a camera; an infrared sensor
a sensor unit for outputting the sensor data by detecting a distance as the detected distance;
a data acquisition module for acquiring data from the camera and the sensor unit; and
an RF unit for transmitting the data acquired by the data acquisition module to the user interface device; and
wherein when the camera data is not in the normal condition, the display of camera data is shifted to the at least one auxiliary screen when the display on the main screen is changed to display the sensor data.

3. The user interface device of claim 1, wherein the environment evaluation module determines that the received camera data are in the normal condition for the remote location environment information when a brightness of the camera data is within a range between a first reference value and a second reference value for setting a brightness limit.

4. The user interface device of claim 1, wherein the environment evaluation module determines that the received camera data are not in the normal condition when the camera data is an error or when the camera data does not receive data from the external device.

5. The user interface device of claim 2, wherein the screen display mode change module displays infrared data on the main screen when the camera data are in the normal condition for the remote location environment information, and when the camera data are not in the normal condition, ultrasonic sensor data is displayed on the main screen.

6. The user interface device of claim 5, wherein the screen display mode change module displays, if an obstacle is detected by the infrared sensor, when the camera data are not in the normal condition, infrared sensor data on the main screen.

7. The user interface device of claim 1, wherein the radio frequency (RF) unit for receiving, from the external device, the camera data and sensor data having the remote location environment information, the received camera data and the sensor data are transmitted through a server or base-station from the external device.

8. A user interface method, comprising:
receiving, from an external device, camera data and sensor data having a remote location environment information;
determining whether the received camera data are in a normal condition for the remote location environment information;
displaying, when the received camera data are in the normal condition, the camera data on a main screen of a display having at least two screens; and
displaying, when the received camera data are not in the normal condition the sensor data, sensed from an ultrasonic sensor on the main screen,
wherein determining whether the received camera data are in a normal condition includes evaluating the remote location environment information of the external device, and changing a display on the main screen from the camera data to the ultrasonic sensed data.

9. The user interface method of claim 8, wherein the external device is a remote control robot comprising:
a camera;
a sensor unit having the ultrasonic sensor for detecting a distance;
a data acquisition module for acquiring data from the camera and the sensor unit; and
an RF unit for transmitting the data acquired by the data acquisition module to a user interface device.

10. The user interface method of claim 8, wherein the normal condition is a range of light intensity between a first reference value for setting a brightness limit and a second reference value for setting a darkness limit.

11. The user interface method of claim 9, wherein the sensor unit further comprises an infrared sensor that outputs infrared sensor data.

12. The user interface method of claim 11, wherein the sensor data further comprises infrared sensor data.

13. The user interface method of claim 12, further comprising:
   detecting an obstacle by the infrared sensor; and
   displaying, if the camera data are not displayed on the main screen, the infrared sensor data on the main screen when the remote location environment information is determined to be within a predetermined light intensity value range.

14. The user interface method of claim 10, further comprising:
   detecting an obstacle by the ultrasonic sensor; and
   displaying, if the camera data are not displayed on the main screen, an ultrasonic sensor data on the main screen.

15. The user interface method of claim 8, wherein the received camera data and the at ultrasonic sensed data are transmitted through a server or base- station from the external device.

16. A method of providing a user interface comprising:
   receiving camera data and sensor data having a remote location environment information from an external device;
   determining whether the received camera data are in a normal condition;
   determining that the received camera data are not in the normal condition when the camera data is an error or when the camera data does not receive data from the external device; and
   displaying the camera data on a screen if the received camera data are in the normal condition, and displaying the received sensor data on the screen comprising ultrasonic sensed data from an ultrasonic sensor if the received camera data are not in the normal condition or when the camera data is not received from the external device;
   wherein the determining whether the received camera data are in the normal condition includes evaluating the remote location environment information of the external device, and wherein displaying the received sensor data includes changing a display on a main screen from the camera data to the ultrasonic sensed data.

* * * * *

UNITED STATES PATENT AND TRADEMARK OFFICE
CERTIFICATE OF CORRECTION

| | | |
|---|---|---|
| PATENT NO. | : 9,002,520 B2 | |
| APPLICATION NO. | : 12/336717 | |
| DATED | : April 7, 2015 | |
| INVENTOR(S) | : Hong et al. | |

It is certified that error appears in the above-identified patent and that said Letters Patent is hereby corrected as shown below:

In the Claims

Column 11, Claim 15, Line 17 should read:
--...the ultrasonic sensed data...--

Signed and Sealed this
Fourteenth Day of July, 2015

Michelle K. Lee
*Director of the United States Patent and Trademark Office*